(12) United States Patent
Mastandrea

(10) Patent No.: US 7,555,807 B1
(45) Date of Patent: Jul. 7, 2009

(54) WINDSHIELD BLOWING DEVICE

(76) Inventor: Christopher Mastandrea, 89 Madison Gardens, Old Bridge, NJ (US) 08857

( * ) Notice: Subject to any disclaimer, the term of this patent is extended or adjusted under 35 U.S.C. 154(b) by 453 days.

(21) Appl. No.: 11/490,814

(22) Filed: Jul. 21, 2006

(51) Int. Cl.
- *A47L 5/38* (2006.01)
- *A47L 15/00* (2006.01)
- *A47L 1/00* (2006.01)
- *B60S 1/54* (2006.01)
- *B60S 1/64* (2006.01)
- *B60S 1/02* (2006.01)
- *B60S 1/58* (2006.01)
- *B60J 1/20* (2006.01)
- *B05B 1/24* (2006.01)

(52) U.S. Cl. .................. 15/313; 15/250.01; 15/250.05; 454/123; 454/130; 239/130

(58) Field of Classification Search .................. 15/313, 15/250.01, 250.05; 454/123, 130; 239/130, 239/131; 417/231
See application file for complete search history.

(56) References Cited

U.S. PATENT DOCUMENTS

| | | | | |
|---|---|---|---|---|
| 1,778,278 A | * | 10/1930 | Schanbacher | ............... 454/123 |
| 1,870,726 A | * | 8/1932 | Greene | ........................ 454/123 |
| 2,187,281 A | * | 1/1940 | Pagliaroni | ................... 454/123 |
| 2,926,396 A | * | 3/1960 | Hess | ........................... 454/123 |
| 3,416,428 A | * | 12/1968 | Heller | ........................ 454/123 |
| 3,769,898 A | | 11/1973 | Ide | |
| 4,088,269 A | * | 5/1978 | Schlick | ...................... 239/133 |
| D324,667 S | | 3/1992 | Williams | |
| 5,097,563 A | * | 3/1992 | Cowan | ........................ 15/313 |
| 5,140,719 A | | 8/1992 | Cowan | |
| 5,269,464 A | * | 12/1993 | Epple et al. | ................. 239/130 |
| 5,486,139 A | | 1/1996 | Papp | |
| 5,605,286 A | * | 2/1997 | Orth et al. | ................ 239/284.2 |
| 5,852,846 A | | 12/1998 | Gonzalez | |
| 6,186,156 B1 | * | 2/2001 | Schlein | ....................... 134/105 |
| 6,354,515 B1 | * | 3/2002 | Matsumoto et al. | ...... 239/284.1 |
| 6,438,789 B1 | * | 8/2002 | Murawa et al. | ............ 15/250.1 |
| 2005/0150982 A1 | * | 7/2005 | Lopez et al. | ................ 239/601 |

* cited by examiner

*Primary Examiner*—Bryan R Muller
(74) *Attorney, Agent, or Firm*—Lawrence J. Gibney, Jr.

(57) ABSTRACT

This is a windshield-blowing device, which can retract through an existing device placed on the hood of the vehicle. It will direct air from an air supply towards a series of tubes, which telescope, and eventually through a series of holes in a manifold that can pivot or swivel.

2 Claims, 4 Drawing Sheets

WINDSHIELD BLOWING DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

This relates to clearing windshields, particularly in northern environments where ice or snow may accumulate on a windshield. It may also be used with extreme rain conditions.

B. Prior Art

There are many other prior art references to windshield-cleaning devices. The purpose, of course, is to eliminate any accumulated snow or ice. A typical example that can be found in the prior art is Gonzalez, U.S. Pat. No. 5,852,846, which is a windshield airstream deflector for vehicles. This uses air that is directed through a plurality of vents towards the windshield in order to clear the windshield of any accumulated ice or snow. Another example in the prior art can be found at Papp, U.S. Pat. No. 5,486,139. Papp is an exterior windshield surface blower, which directs the flow of air at the windshield to remove rain and snow.

Other examples include Cowan, U.S. Pat. No. 5,140,719, and Cowan, U.S. Pat. No. 5,097,563. None of the other prior art references feature all the functions and particular structure of this device.

BRIEF SUMMARY OF THE INVENTION

This is a device to clear windshields of accumulated snow or ice. It will rest on the top of a hood of a vehicle. The device will be housed within a structure, which has the form of a wedge so as not to interfere with the aerodynamics of the automobile.

On the bottom of the device, a hole in the hood will provide a means to mount the wedge. Below the hood will be a coupling mechanism to couple this device to an air line. Air is forced through the tubing and through a series of air holes or ports at one end to clear the windshield. The device will be protected by the wedge mechanism on the top of the hood.

Additionally, there will be a series of telescoping tubes within the wedge, which will allow the car owner to move the device towards the windshield. Additionally, there will be a swivel on one end of the telescoping arm to allow the head or manifold to swivel and provide the maximum amount of coverage for this device. The unit itself will be operated from the interior of the car and will allow telescoping tubes to telescope to the surface of the windshield.

It is an object of this device to provide a mechanism by which accumulated rain and snow may be cleared from windshields.

DETAILED DESCRIPTION OF THE EMBODIMENTS

Figure 1:
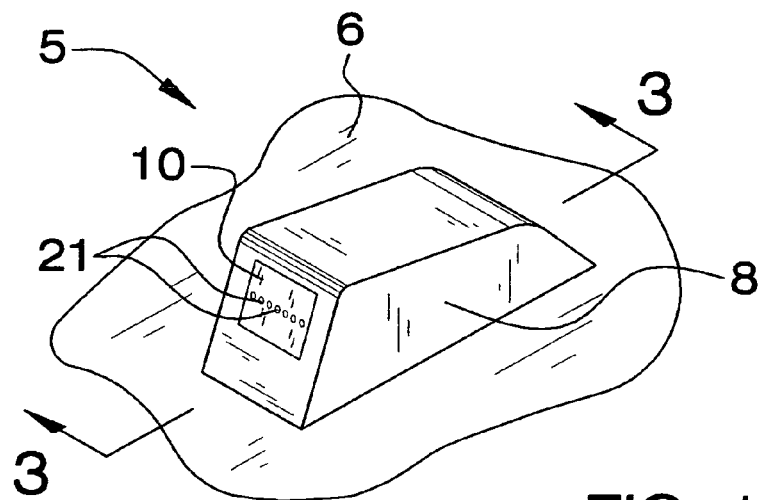
FIG. 1 is a partially fragmented isometric view of the device.
Figure 2:
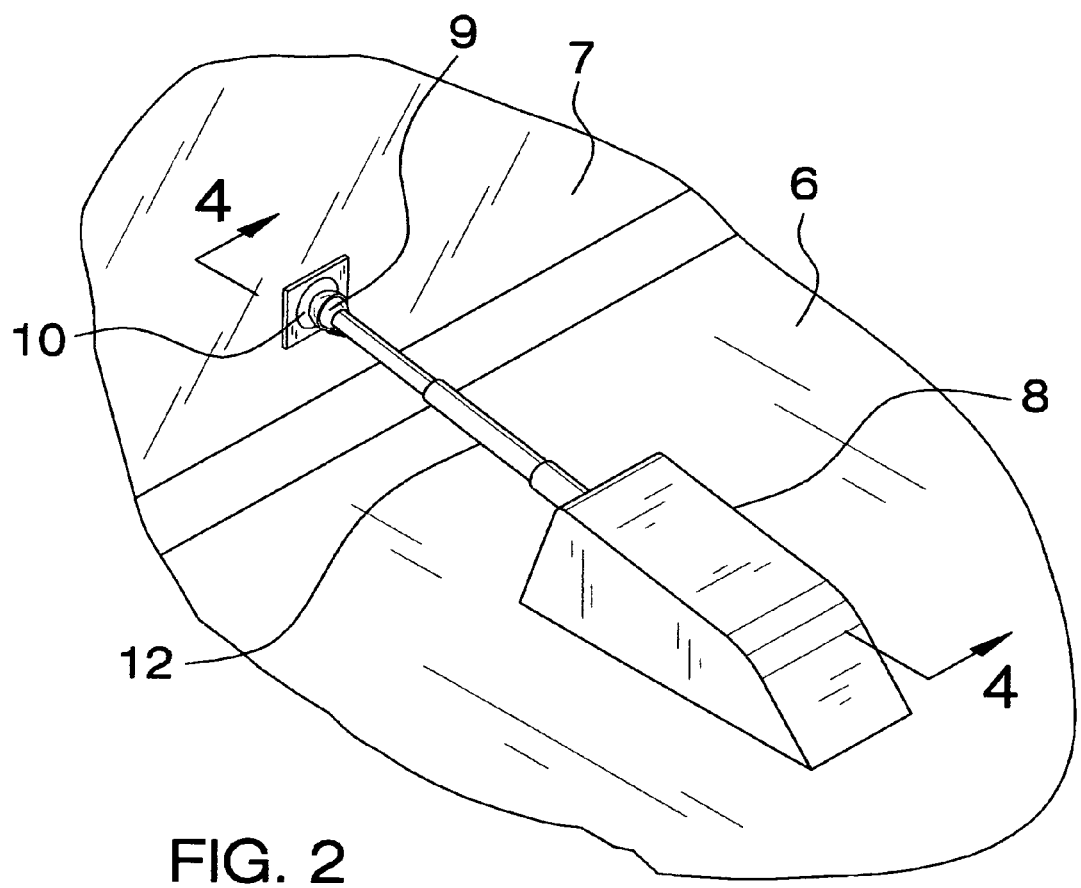
FIG. 2 is a partial fragmented view of the device in use.
Figure 3:
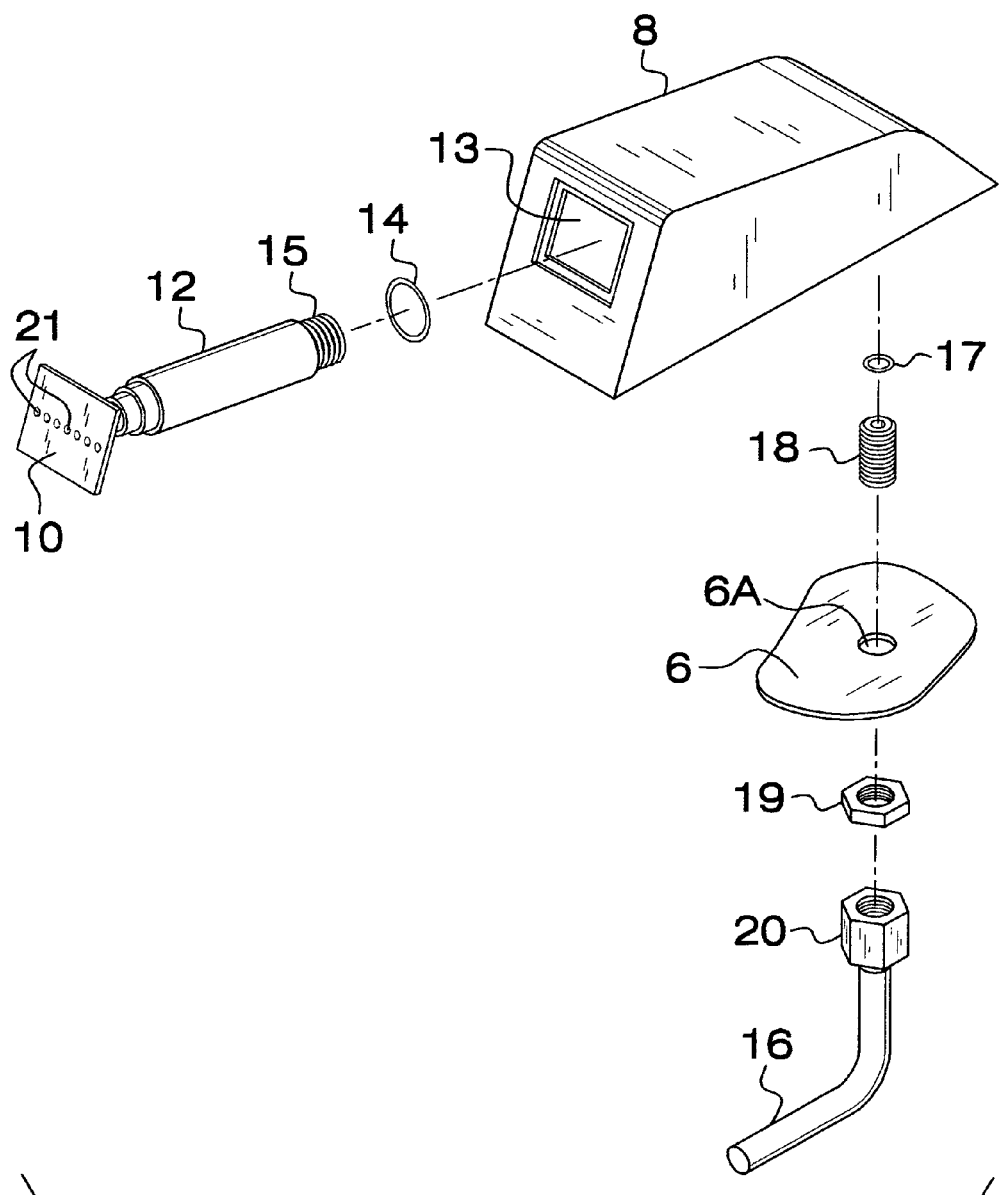
FIG. 3 is an exploded isometric view of the device.
Figure 4:
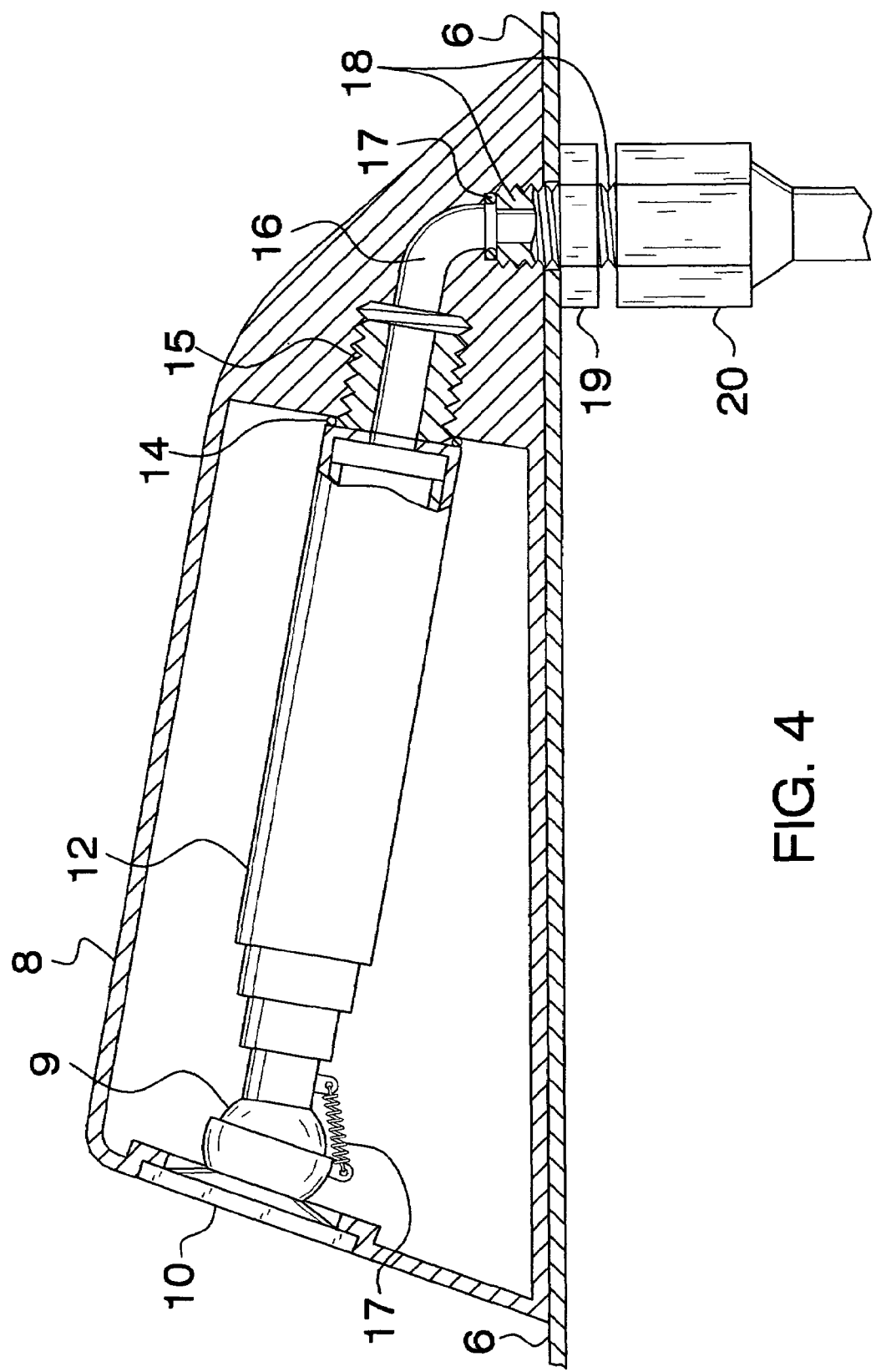
FIG. 4 is a view according to line 3-3 on FIG. 1.

This device 5 is a device to clear a windshield of accumulated snow and/or ice. This device would be very beneficial in northern environments and may also be used to clear rain from a windshield. An air supply must be provided to operate this device.

The device will be coupled to an air line from beneath the hood of the automobile. A portion of the device will rest on the hood of the car 6. A protective mechanism 8, which is in the general shape of a wedge, is placed on the top of the hood and secured to an air line 16 with a coupling and nut 19. A through hole 6A in the hood 6 with a threaded port 18 allows the air line 16 to be secured to the air tube 16 in the wedge 8. Air will be forced through the line 16 and through the tube 12 towards the windshield 7.

The stream of air will enter a threaded coupling 15 and through a series of telescoping tubes 12. At one end of the telescoping tubes will be a jet manifold 10 as well as a spring 11. The jet manifold 10 will have a series of holes 21 through which the air will pass as it is directed towards the windshield 7. The spring will allow a swivel 9, which mounts the jet manifold to alternate positions for maximum efficiency. A threaded seal 14 on one end of the telescoping tubes 12 and the air tube 15 to ensure that the maximum flow of air is provided.

Figure 5:
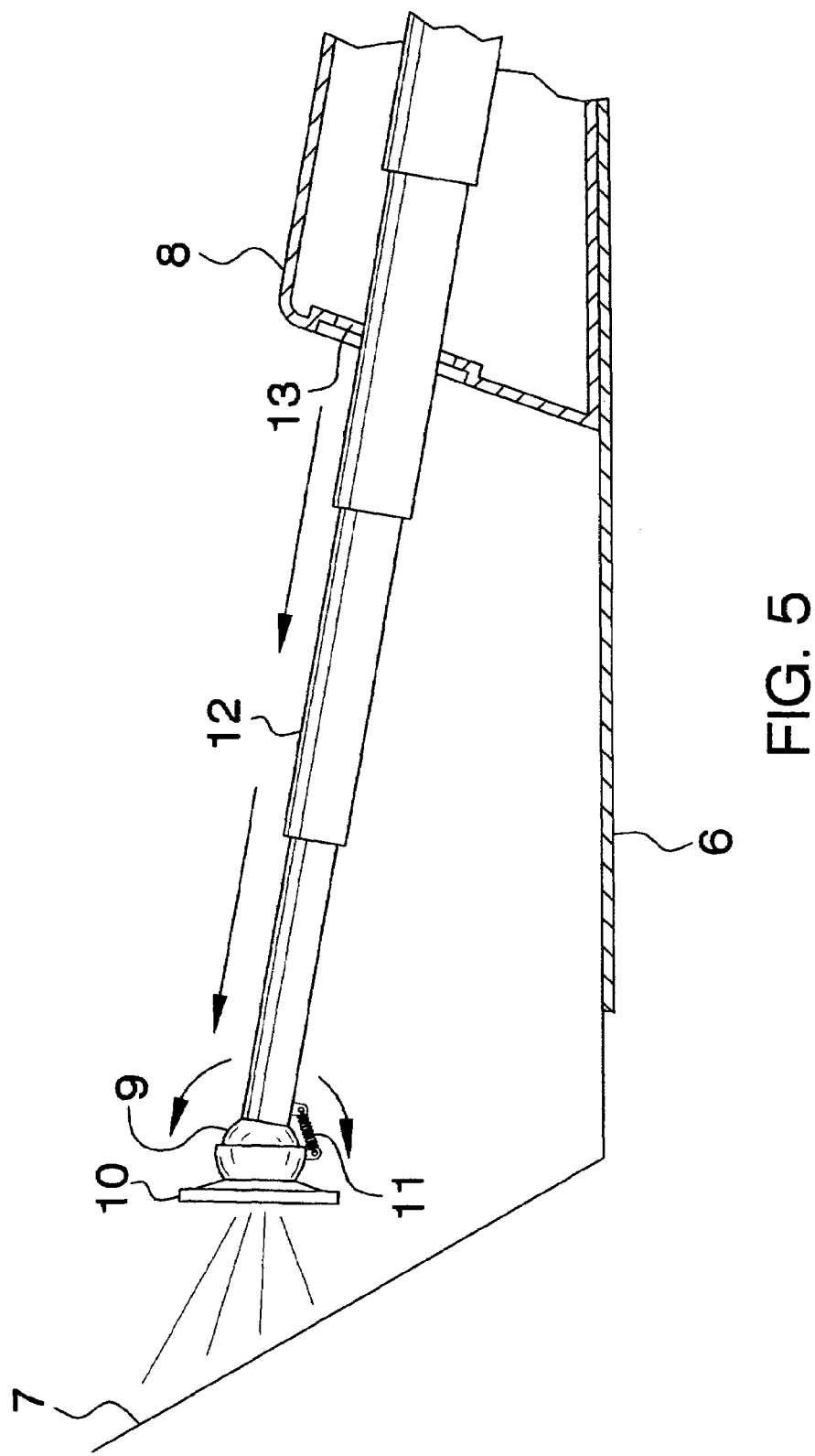
FIG. 5 is a view of the device in use.

In operation, the air will be forced through the telescoping tubes through the jet manifold 10 and onto the windshield as depicted in FIG. 5.

Additionally, the device will fit flush against one end of the wedge 8 in a recess to prevent injury to the jet manifold 10 when it is not in use. The opening for the jet manifold 10 is also slightly recessed so that the manifold 10 with the airports 21 sits flush against the surface of the wedge 8.

The device may be operated from the interior of the car or may be remotely operated by a separate control.

While the embodiments of the invention have been disclosed, certain modifications may be made by those skilled in the art to modify the invention without departing from the spirit of the invention.

The inventor claims:

1. A device to remove debris, ice and/or snow from a windshield, which is comprised of:
   a. a wedge structure;
      wherein the wedge structure is secured to the top of an automobile hood;
      wherein the wedge structure is a predetermined distance from the windshield;
      wherein a mechanism to secure the wedge is provided;
   b. an air line;
      wherein the air line is routed from an air supply from the automobile to the interior of the wedge;
   c. a plurality of telescoping tubes that fit within one another;
      wherein the telescoping tubes have a first end and a second end;
      said first end is secured to the interior of the wedge;
      wherein the second end has a swivel;
      wherein a manifold is secured to the swivel;
      wherein a spring is connected at one end to the manifold to rotate the manifold;

wherein air ports are provided on the manifold;
wherein the tubes have the ability to telescope towards the windshield;
wherein a cavity to house the manifold is slightly recessed in the exterior of the wedge structure.

2. The device as described in claim 1 wherein seals are provided between the air line and the manifold to minimize loss of air.

* * * * *